US006046407A

United States Patent [19]

Ide

[11] Patent Number: 6,046,407

[45] Date of Patent: Apr. 4, 2000

[54] CONNECTING STRUCTURE FOR COVERED WIRES

[75] Inventor: Tetsuro Ide, Shizuoka-ken, Japan

[73] Assignee: Yazaki Corporation, Tokyo, Japan

[21] Appl. No.: 09/260,472

[22] Filed: Mar. 2, 1999

[30] Foreign Application Priority Data

Mar. 3, 1998 [JP] Japan .............................. P 10-051039

[51] Int. Cl.[7] ...................................................... H02G 15/02

[52] U.S. Cl. ............................................. 174/78; 174/84 R

[58] Field of Search ................................ 174/74 R, 75 R, 174/75 C, 78, 84 R, 88 R, 92, 94 R; 439/98, 99, 578, 874

[56] References Cited

U.S. PATENT DOCUMENTS

| | | | |
|---|---|---|---|
| 3,097,258 | 7/1963 | Modrey | 174/94 R |
| 3,418,444 | 12/1968 | Ruehlemann | 174/84 R |
| 5,584,122 | 12/1996 | Kato et al. | 29/872 |
| 5,869,784 | 2/1999 | Shinchi | 174/84 R |
| 5,922,993 | 7/1999 | Ide et al. | 174/84 R |
| 5,925,202 | 7/1999 | Ide et al. | 174/84 R |
| 5,929,384 | 7/1999 | Ide et al. | 174/84 R |

FOREIGN PATENT DOCUMENTS 0 838 883 A2 4/1998 European Pat. Off. .

7-320842 12/1995 Japan .

OTHER PUBLICATIONS

The Patent Office, Search Report Under Section 17, for application No. GB9904806.8, dated May 19, 1999.

*Primary Examiner*—Kristine Kincaid
*Assistant Examiner*—Chau N. Nguyen
*Attorney, Agent, or Firm*—Finnegan, Henderson, Farabow, Garrett & Dunner, L.L.P.

[57] ABSTRACT

A connecting structure for covered wires is provided. At first, a shield wire 1 and a ground wire 2 are prepared. After overlaying the ground wire 2 on the shield wire 1 cross each other, respective overlapping portions of the wires 1, 2 are interposed between an upper resin tip 13 and a lower resin tip 14. Next, the upper and lower resin tips 13, 14 are oscillated with ultrasonic waves while compressing the upper and lower resin tips 13, 14 from the outside. Consequently, respective outside rinds 1*d*, 2*b* of the wires 1, 2 are molten for removal, so that a braided wire 1*c* comes into electrical contact with a core line 2*a*. The upper resin tips 13 is provided, on its butt face, with a stopper 13*b* for defining the position of a leading end of the ground wire 2, while the lower resin tip 14 is provided, on its butt face, with a recess 14*b* for receiving the stopper 13*b*.

4 Claims, 4 Drawing Sheets

CONNECTING STRUCTURE FOR COVERED WIRES

BACKGROUND OF THE INVENTION

1. Field of the Invention

The present invention relates to a connecting structure for covered wires where their respective conductors are connected to each other by oscillating respective insulating covers of the wires with ultrasonic waves. More particularly, it relates to a connecting structure which is effective to connect a shield wire with a ground wire.

2. Description of the Related Art

Generally, it is complicated and troublesome to handle a shield wire having a braided wire coaxially disposed around a core line (or core lines) with the deteriorated workability in using the shield wire. As an effective measure for improving the deteriorated workability, there is provided a connecting structure for wires which takes advantage of inside heating due to the ultrasonic oscillation by Japanese Unexamined Patent Publication (kokai) No. 7-320842.

In the publication, there are shown two kinds of covered wires. One is a shield wire which comprises a core line, an inside insulating rind arranged outside the core line, a braided wire as a shield conductor arranged outside the inside insulating rind, and an outside insulating rind. The other is a ground wire consisting of a core line and an outside resinous rind arranged outside the core line.

According to the disclosed method of connecting the braided wire of the shield wire being connected to a connector, to the core line of the ground wire being also connected to the connector, in front of the connector, the ground wire is firstly overlaid on the shield wire so as to cross each other at a connection point. Next, the overlapping portions are interposed between upper and lower resin tips. Then, while compressing the upper and lower resin tips from the outside, they are subjected to ultrasonic oscillation by making use of an ultrasonic horn and an anvil. Consequently, both of the outside rinds of the shield wire and the ground wire are molten for elimination, so that the braided wire of the shield wire comes into electrical contact with the core line of the ground wire. Simultaneously, the upper and lower resin tips are mutually welded to each other thereby to seal up the surroundings of the above connecting point. In a modification, the upper and lower resin tips are provided on bearing faces respectively thereof, wire-accommodating shallow grooves for positioning the shield wire.

However, in the so-obtained connecting structure a tip of the core line of the ground wire sometimes projects from the integrated upper and lower resin tips, so that the connecting part gets larger due to the resultant protrusion, causing an obstacle to arranging the wire harness. In addition, the problem of reduction in the insulating effect arises from the projecting conductor (core line) of the ground wire.

SUMMARY OF THE INVENTION

Under such a circumstance, it is therefore an object of the present invention to provide a connecting structure for covered wires, which is capable of preventing a conductor of the covered wire from projecting from the structure.

The object of the present invention described above can be accomplished by a connecting structure for covered wires, comprising:

a first covered wire having a first conductor covered with a first resinous cover;

a second covered wire having a second conductor covered with a second resinous cover, the second conductor being electrically connected with the first conductor of the first covered wire cross each other; and an upper resin tip and a lower resin tip between which an electrical connecting part of the first and second conductors and the surroundings are interposed, the upper resin tip being welded to the lower resin tip while interposing the first and second covered wires between the upper resin tip and the lower resin tip;

wherein either one of the upper and lower resin tips is provided, on its butt face being abutted against the other resin tip, with a stopper as a projection for defining the position of a leading end of the second covered wire interposed between the upper and lower resin tips, while the other of the upper and lower resin tips is provided, on its butt face being abutted against the other resin tip, with a recess for receiving the stopper.

With the above-mentioned connecting structure, since the stopper serves to define the tip of the second covered wire in position, there is no possibility that the a tip of the second conductor of the second covered wire projects from the upper and lower resin tips. Therefore, since a protrusion resulting from the projecting second conductor of the second covered wire is eliminated on the peripheral face of the welded resin tips, it is possible to provide the small-sized connecting part between the first and second covered wires, whereby the workability in arranging the wire harness can be improved. Further, with the reduction of an exposed portion of the second conductor, it is possible to improve the insulating effect of the connecting structure.

In the above-mentioned connecting structure, preferably, the first covered wire is a shield wire, while the second wire is a ground wire and the first conductor is a shield conductor of the shield wire, while the second conductor is a core line of the ground wire.

With the preferred structure, as the stopper serves to prevent the core line of the ground wire from projecting from the upper and lower resin tips, it is possible to avoid the exposure of the core line. Thus, also in this case, since a protrusion resulting from the projecting core line of the ground covered wire is eliminated on the peripheral face of the completed connecting part, it is possible to provide the small-sized connecting part between the shield wire and the ground wire, so that the workability in arranging the wire harness can be improved.

In the above-mentioned connecting structure, preferably, the stopper is substantially U-shaped in its plan view to form a groove for fitting the leading end of the second covered wire, the groove being defined by a pair of opposing sidewalls, and a distance between the sidewalls of the groove is smaller than a diameter of the second covered wire.

With the preferred connecting structure, since the leading end of the second covered wire is fitted in the groove of the stopper, it is possible to fix the second covered wire securely. Therefore, the setting operation of the ground wire can be facilitated. Furthermore, as the displacement of ground wire during the welding can be restricted owing to the provision of the stopper, it is possible to improve the electrical reliability of the connecting part.

In the present invention, preferably, each of the upper and lower resin tips is provided, on its butt face being abutted against the other resin tip, with a wire receiving groove which has a semi-circular cross section having a diameter substantially equal to a diameter of the first covered wire.

According to the preferred connecting structure, since the diameter of the wire receiving groove is substantially equal to the diameter of the first covered wire, it is possible to weld the upper resin tip to the lower resin tip in the wrapping manner without compressing the first resinous cover of the first covered wire. Thus, since there is no possibility that the first resinous cover of the first covered wire is torn or broken by the upper or lower resin tip, the fixing force between the upper and lower resin tips and the first covered wire can be enhanced. In addition, it is possible to exclude a possibility that the first covered wire exposes the first conductor in the vicinity of the upper and lower resin tips.

According to the present invention, there is also provided a method of producing a connecting structure for covered wires, the method comprising the steps of:

preparing a first covered wire having a first conductor covered with a first resinous cover and a second covered wire having a second conductor covered with a second resinous cover;

overlaying the second covered wire on the first covered wire cross each other;

interposing respective overlapping portions of the first and second covered wires between an upper resin tip and a lower resin tip; and oscillating the upper and lower resin tips with ultrasonic waves while compressing the upper and lower resin tips from the outside, whereby the first and second resinous covers of the first and second covered wires are molten for removal thereby to bring the first conductor of the first covered wire into electrical contact with the second conductor of the second covered and simultaneously, the upper and lower resin tips are mutually welded to each other thereby to seal up the surroundings of a contact between the first conductor and the second conductor;

wherein either one of the upper and lower resin tips is provided, on its butt face being abutted against the other resin tip, with a stopper as a projection for defining the position of a leading end of the second covered wire interposed between the upper and lower resin tips, while the other of the upper and lower resin tips is provided, on its butt face being abutted against the other resin tip, with a recess for receiving the stopper.

Also in the above-mentioned method, preferably, the first covered wire is a shield wire, while the second wire is a ground wire and the first conductor is a shield conductor of the shield wire, while the second conductor is a core line of the ground wire.

Also in the above-mentioned method, preferably, the stopper is substantially U-shaped in its plan view to form a groove for fitting the leading end of the second covered wire, the groove being defined by a pair of opposing sidewalls, and a distance between the sidewalls of the groove is smaller than a diameter of the second covered wire.

Also in the above-mentioned method, preferably, each of the upper and lower resin tips is provided, on its butt face being abutted against the other resin tip, with a wire receiving groove which has a semi-circular cross section having a diameter substantially equal to a diameter of the first covered wire.

These and other objects and features of the present invention will become more fully apparent from the following description and appended claims taken in conjunction with the accompany drawings.

BRIEF DESCRIPTION OF THE DRAWINGS

FIGS. 1A and 1B are views showing resin tips constituting a connecting structure in accordance with the first embodiment of the present invention, in which FIG. 1A is a perspective view showing an upper resin tip turned over and FIG. 1B is a perspective view showing a lower resin tip;

FIGS. 2A and 2B show the connecting structure of the first embodiment, in which FIG. 2A is a perspective view of the connecting structure and FIG. 2B is a view in the direction of an arrow IIb of FIG. 2A;

FIGS. 3A, 3B and 3C are views showing resin tips constituting the connecting structure in accordance with the second embodiment of the present invention, in which FIG. 3A is a perspective view showing an upper resin tip turned over, FIG. 3B is a perspective view showing a lower resin tip, and FIG. 3C is an enlarged plan view of a portion indicated with an arrow IIIc; and FIGS. 4A and 4B show the connecting structure of the second embodiment, in which FIG. 4A is a perspective view of the connecting structure and FIG. 4B is a cross sectional view of the connecting structure, taken along a line IVb—IVb of FIG. 4A.

DESCRIPTION OF THE PREFERRED EMBODIMENT

U.S. Pat. No. 5,584,122, Kato et al., issued on Dec. 17, 1996 is characterized by reference herein in its entirety. Embodiments of the present invention will be described with reference to drawings hereinafter.

$1^{st}$. Embodiment

Figure 1A:
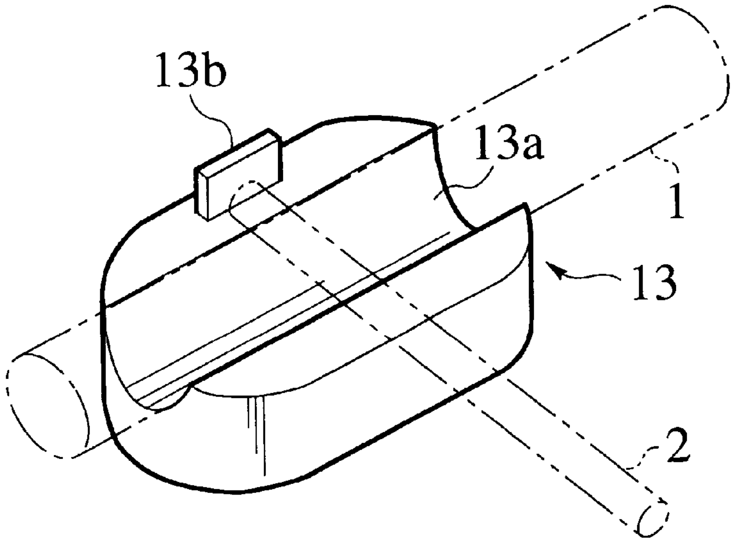
Figure 1B:
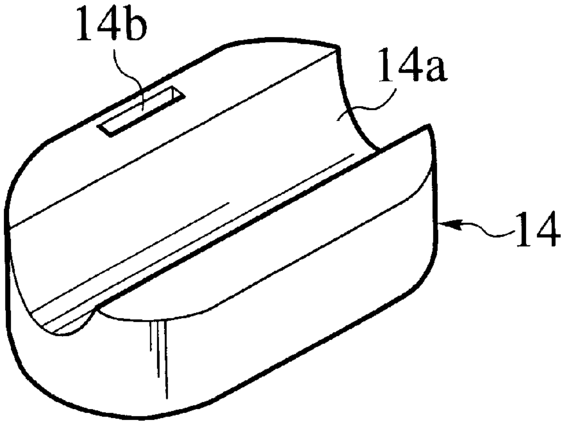

FIGS. 1A and 1B show resin tips constituting the connecting structure in accordance with the first embodiment of the present invention. FIG. 1A shows an upper resin tip 13 turned over, while FIG. 1B shows a lower resin tip 14.

Each of the resin tips 13, 14 is constituted by a plate body having a profile of an elongated circle in its plan view. Formed on respective butt faces (i.e. mutual contact faces being welded) of the upper and lower resin tips 13, 14 are wire receiving grooves 13*a*, 14*a* each of which extends along a direction of the long axis of the elongated circle and has a semicircular cross section of a diameter generally equal to that of an outside rind 1d of the shield wire 1.

According to the embodiment, the upper resin tip 13 is provided, on the butt face, with a stopper 13*b*, which defines the position of a tip of the ground wire 2 when crossing the ground wire 2 on the shield wire 1. Meanwhile, the lower resin tip 14 is provided on the butt face with a recess 14*b* for accommodating the stopper 13*b*. Note, in the modification, the stopper 13*b* may be provided on the lower resin tip 14 while forming the recess 14*b* on the upper resin tip 13, conversely.

Figure 2A:
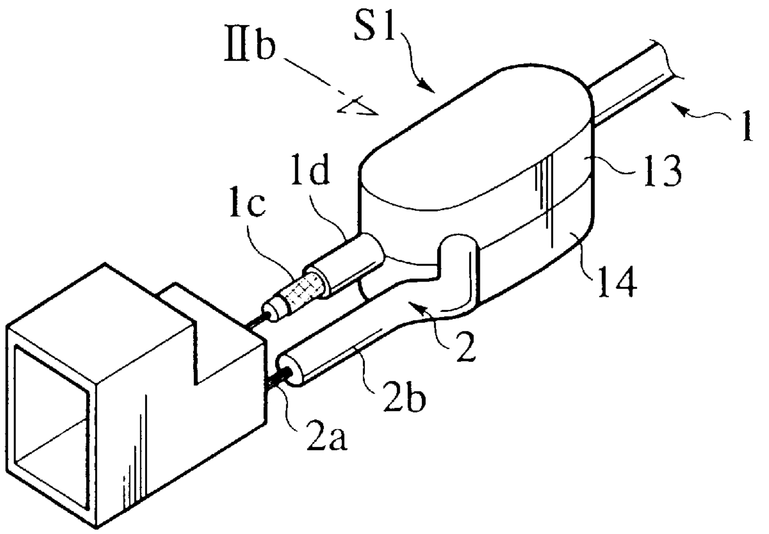
Figure 2B:
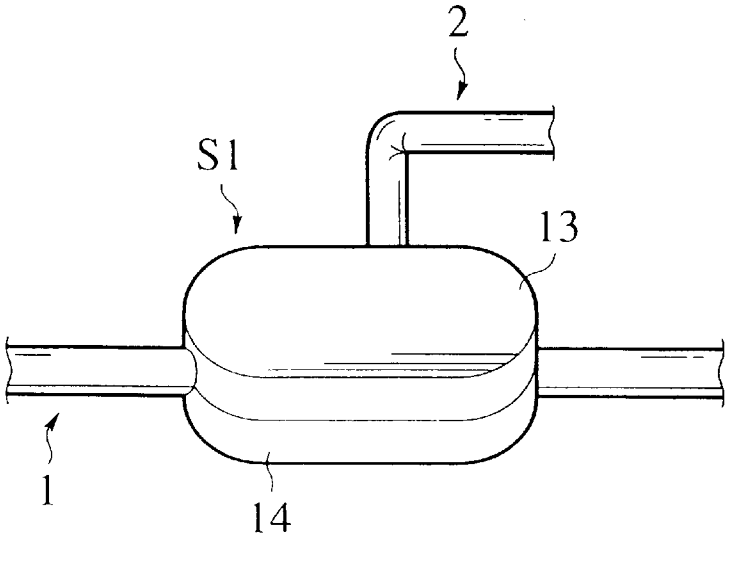

In order to connect the shield wire 1 to the ground wire 2, it is firstly carried out to lay the ground wire 2 on the shield wire 1 so as to cross each other at a connecting part. Next, the overlapping portions of the wires 1, 2 are interposed between the upper resin tip 13 and the lower resin tip 14. At this time, the tip of the ground wire 2 is butted against the stopper 13*b* in order to define the position of the tip of the wire 2. Under such a condition, the overlapping portions of the wires 1, 2 are subjected to ultrasonic oscillation by making use of an ultrasonic horn and an anvil (not shown) while compressing the upper and lower resin tips 13, 14 from the outside. Consequently, both of the outside rind 1d of the shield wire 1 and an outside rind 2*b* of the ground wire 2 are molten for removal, so that a braided wire 1*c* of the shield wire 1 comes into electrical contact with a core line(s) 2*a* of the ground wire 2. Simultaneously, the upper and lower resin tips 13, 14 are mutually welded to each other thereby to seal up the surroundings of the above connecting point. In this way, a connecting part S1 can be obtained between the shield wire 1 and the ground wire 2, as shown in FIGS. 2A and 2B.

According to the resultant connecting structure, since the stopper 13*b* serves to define the position of the tip of the ground wire 2, it is possible to prevent the tip of the core line 2*a* of the wire 2 from projecting from the resin tips 13, 14. Thus, no protrusion resulting from the projecting core line of the ground wire 2 is formed on the peripheral face of the completed connecting part S1, as shown in FIG. 2B. Consequently, with the removal of protrusion, it is possible to provide the small-sized connecting part S1, whereby the workability in arranging the wire harness can be improved.

$2^{nd}$. Embodiment

Figure 3A:
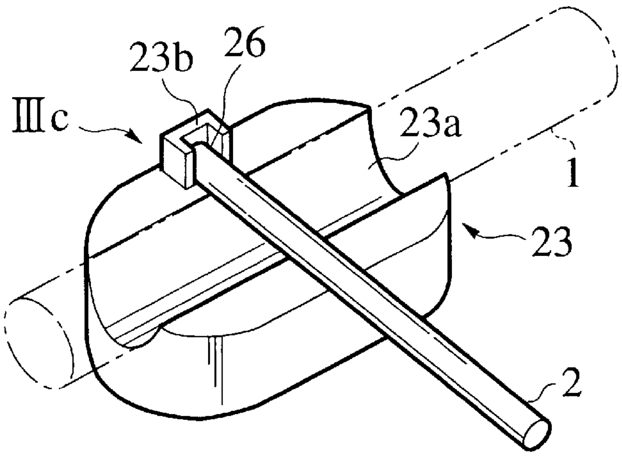
Figure 3B:
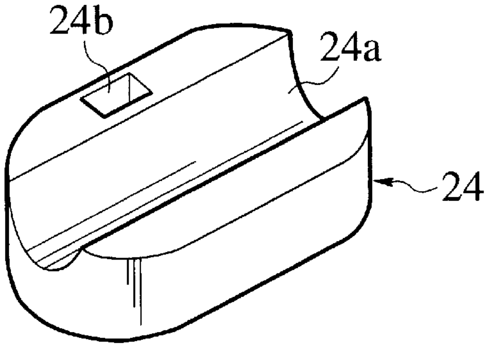
Figure 3C:
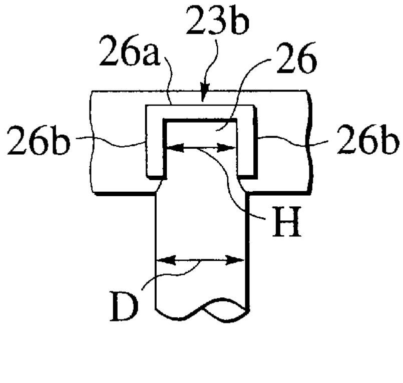

FIGS. 3A, 3B and 3C show resin tips constituting the connecting structure in accordance with the second embodiment of the present invention. FIG. 3A shows an upper resin tip 23 turned over, while FIG. 3B shows a lower resin tip 24. FIG. 3C shows an enlarged part of FIG. 3A, indicated with an arrow IIIc in the figure.

The second embodiment is similar to the first embodiment in view that both of the resin tips 23, 24 are constituted by plate bodies each having a periphery of an elongated circle in its plan view and also provided, on respective butt faces thereof, with wire receiving grooves 23*a*, 24*a* each of which has a diameter corresponding to the diameter of the shield wire 1. The second embodiment differs from the first embodiment in respect of the configuration of the stopper. According to the second embodiment, on the butt face of the upper resin tip 23, a stopper 23*b* is formed to have a substantial U-shaped configuration in plan view, providing a groove 26 for receiving the tip of the ground wire 2. The groove 26 is composed of a front butt wall 26*a* and a pair of sidewalls 26*b*, 26*b* on both sides of the wall 26*a*. As shown in FIG. 3C, it is established that a width H between the sidewalls 26*b*, 26*b* is smaller than a diameter D of the ground wire 2. Therefore, the tip of the ground wire 2 can be fitted between the sidewalls 26*b*, 26*b*. Moreover lower resin tip 24 is provided, on the butt face, with a recess 24*b* for accommodating the stopper 23*b*. Of course, in a modification, the stopper 23*b* may be provided on the lower resin tip 24 may be formed on the upper resin tip 23, conversely.

Figure 4A:
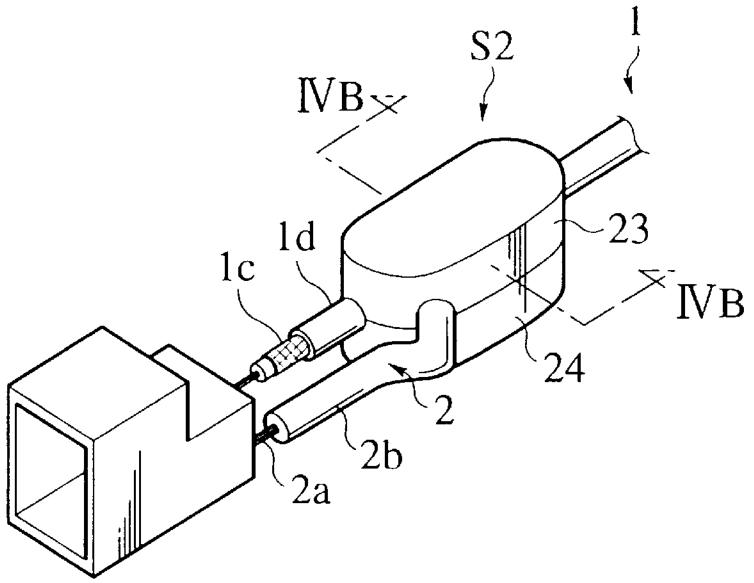
Figure 4B:
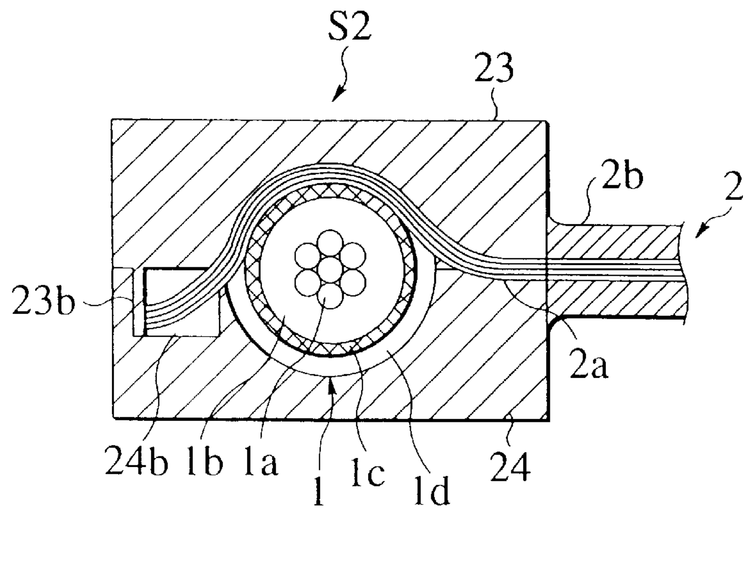

FIGS. 4A and 4B show a connecting part S2 between the shield wire 1 and the ground wire 2, which can be produced by using the resin tips 23, 24. According to the so-obtained structure, since the tip of the ground wire 2 is to be fitted in the groove 26 of the stopper 23*b* in advance of putting the upper and lower resin tips 23, 24 together, it is possible to certainly arrange and fix the tip of the ground wire 2 in position, whereby the setting operation of the ground wire 2 can be facilitated. Furthermore, as the displacement of ground wire 2 during the welding can be restricted owing to the provision of the stopper 23*b*, it is possible to improve the electrical reliability of the connecting part S2. Additionally, since the position of the tip of the core line 2*a* of the ground wire 2 is defined by the stopper 23*b*, it is possible to solve the problem of projecting the tip of the core line 2*a* from the integrated tips 23, 24, as similar to the first embodiment.

Finally, it will be understood by those skilled in the art that the foregoing description is related to two preferred embodiments of the disclosed connecting structure, and that various changes and modifications may be made to the present invention without departing from the spirit and scope thereof.

What is claimed is:

1. A connecting structure for covered wires, comprising:

a first covered wire having a first conductor covered with a first resinous cover;

a second covered wire having a second conductor covered with a second resinous cover, the second conductor being electrically connected with the first conductor of the first covered wire cross each other; and an upper resin tip and a lower resin tip between which an electrical connecting part of the first and second conductors and the surroundings are interposed, the upper resin tip being welded to the lower resin tip while interposing the first and second covered wires between the upper resin tip and the lower resin tip;

wherein either one of the upper and lower resin tips is provided, on its butt face being abutted against the other resin tip, with a stopper as a projection for defining the position of a leading end of the second covered wire interposed between the upper and lower resin tips, while the other of the upper and lower resin tips is provided, on its butt face being abutted against the other resin tip, with a recess for receiving the stopper.

2. A connecting structure as claimed in claim 1, wherein the first covered wire is a shield wire, while the second wire is a ground wire and wherein the first conductor is a shield conductor of the shield wire, while the second conductor is a core line of the ground wire.

3. A connecting structure as claimed in claim 1, wherein the stopper is substantially U-shaped in its plan view to form a groove for fitting the leading end of the second covered wire, the groove being defined by a pair of opposing sidewalls; and wherein a distance between the sidewalls of the groove is smaller than a diameter of the second covered wire.

4. A connecting structure as claimed in claim 1, wherein each of the upper and lower resin tips is provided, on its butt face being abutted against the other resin tip, with a wire receiving groove which has a semi-circular cross section having a diameter substantially equal to a diameter of the first covered wire.

* * * * *